United States Patent
Nam et al.

(10) Patent No.: US 10,490,138 B2
(45) Date of Patent: Nov. 26, 2019

(54) LIGHT VALVE PANEL AND LIQUID CRYSTAL DISPLAY USING THE SAME

(71) Applicant: LG Display Co., Ltd., Seoul (KR)

(72) Inventors: Sangjin Nam, Cheonan-si (KR); Ooksang Yoo, Paju-si (KR); Kyujin Kim, Goyang-si (KR); Seungjin Yoo, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 33 days.

(21) Appl. No.: 15/604,929

(22) Filed: May 25, 2017

(65) Prior Publication Data
US 2017/0343839 A1    Nov. 30, 2017

(30) Foreign Application Priority Data
May 31, 2016    (KR) .................. 10-2016-0067778

(51) Int. Cl.
*G09G 3/34* (2006.01)
*G02F 1/1343* (2006.01)
(Continued)

(52) U.S. Cl.
CPC .......... *G09G 3/3406* (2013.01); *G02F 1/137* (2013.01); *G02F 1/13471* (2013.01); *G02F 1/134309* (2013.01); *G09G 3/2003* (2013.01); *G09G 3/2007* (2013.01); *G09G 3/3413* (2013.01); *G09G 3/3655* (2013.01); *G09G 3/3688* (2013.01); *G02F 2001/133601* (2013.01);
(Continued)

(58) Field of Classification Search
CPC .......... G02F 1/137; G02F 1/13471; G02F 1/134309; G02F 2001/133601; G09G 3/2003; G09G 3/3655; G09G 3/3406; G09G 3/3413; G09G 3/2007; G09G 3/3688; G09G 2320/0238; G09G 2300/023; G09G 2320/0626; G09G 2320/066; G09G 2300/0426; G09G 2310/08; G09G 3/3426; G09G 2320/028; G09G 2320/0242; G09G 2320/0646
See application file for complete search history.

(56) References Cited

U.S. PATENT DOCUMENTS

2005/0140632 A1    6/2005  Tsuda et al.
2008/0180419 A1*   7/2008  Tung .................. G09G 3/3655
                                                      345/204
(Continued)

OTHER PUBLICATIONS

Extended European Search Report, dated Feb. 15, 2018 for the European patent application No. 17173485.8.
(Continued)

*Primary Examiner* — Premal R Patel
(74) *Attorney, Agent, or Firm* — Polsinelli PC

(57) ABSTRACT

A light valve panel and a liquid crystal display using the same are discussed. The light valve panel according to an aspect includes a liquid crystal layer, a first electrode receiving a light valve data voltage through a light valve data line, and a second electrode facing the first electrode with the liquid crystal layer interposed therebetween, and receiving a common voltage swinging in the same phase in synchronization with the light valve data voltage. The liquid crystal display device according to another aspect includes a display panel, a backlight unit, and a light valve panel.

17 Claims, 16 Drawing Sheets

(51) Int. Cl.
  *G02F 1/137* (2006.01)
  *G09G 3/20* (2006.01)
  *G09G 3/36* (2006.01)
  *G02F 1/1347* (2006.01)
  *G02F 1/1335* (2006.01)

(52) U.S. Cl.
  CPC ..... *G09G 3/3426* (2013.01); *G09G 2300/023* (2013.01); *G09G 2300/0426* (2013.01); *G09G 2310/08* (2013.01); *G09G 2320/028* (2013.01); *G09G 2320/0238* (2013.01); *G09G 2320/0242* (2013.01); *G09G 2320/066* (2013.01); *G09G 2320/0626* (2013.01); *G09G 2320/0646* (2013.01)

(56) References Cited

U.S. PATENT DOCUMENTS

| | | | |
|---|---|---|---|
| 2009/0059110 A1 | 3/2009 | Sasaki et al. | |
| 2009/0128722 A1 | 5/2009 | Kim et al. | |
| 2010/0085336 A1* | 4/2010 | Yang | G09G 3/3688 345/205 |
| 2010/0277682 A1* | 11/2010 | Lee | G02F 1/134309 349/139 |
| 2011/0032454 A1* | 2/2011 | Ikeno | G02F 1/133514 349/81 |
| 2011/0141405 A1* | 6/2011 | Kitagawa | G02F 1/133504 349/74 |
| 2011/0279749 A1* | 11/2011 | Erinjippurath | G09G 3/3426 349/61 |
| 2012/0098740 A1* | 4/2012 | Chiu | G09G 3/344 345/107 |
| 2015/0062451 A1* | 3/2015 | Ono | G02F 1/136227 349/12 |
| 2016/0042701 A1 | 2/2016 | Furumoto | |
| 2016/0093255 A1* | 3/2016 | Aoki | G09G 3/3426 345/690 |
| 2016/0195756 A1* | 7/2016 | Oh | G02F 1/134309 349/33 |
| 2017/0116941 A1* | 4/2017 | Baek | G09G 3/3614 |
| 2017/0179168 A1* | 6/2017 | Suzuki | G02F 1/133553 |
| 2017/0229077 A1* | 8/2017 | Huang | G09G 3/3614 |
| 2017/0235414 A1* | 8/2017 | Ding | G06F 3/047 345/174 |
| 2017/0269413 A1* | 9/2017 | Tamaki | G02F 1/13306 |

OTHER PUBLICATIONS

European Search Report (partial), dated Oct. 10, 2017 for the European patent application No. 17173485.8.

* cited by examiner (A)

(B)

(C)

LIGHT VALVE PANEL AND LIQUID CRYSTAL DISPLAY USING THE SAME

CROSS REFERENCE TO RELATED APPLICATION

This application claims the priority benefit of Korean Patent Application No. 10-2016-0067778 filed on May 31, 2016, the entire contents of which is incorporated herein by reference for all purposes as if fully set forth herein.

BACKGROUND

Field of the Disclosure

The present disclosure relates to a liquid crystal display capable of controlling an amount of light incident on a display panel based on a luminance distribution of an input image.

Discussion of the Background

Various flat panel displays, such as a liquid crystal display (LCD), an organic light emitting diode (OLED) display, a plasma display panel (PDP), and an electrophoretic display (EPD), have been developed. A liquid crystal display displays an image by controlling an electric field applied to liquid crystal molecules based on a data voltage. An active matrix liquid crystal display includes a thin film transistor (TFT) at each pixel.

A liquid crystal display includes a display panel having a liquid crystal layer, a backlight unit irradiating light onto the display panel, a source driver integrated circuit (IC) for supplying a data voltage to data lines of the display panel, a gate driver IC for supplying gate pulses (or scan pulses) to gate lines (or scan lines) of the display panel, a control circuit for controlling the source driver IC and the gate driver IC, and a light source driving circuit for driving light sources of the backlight unit.

Gray levels of an input image are produced by the data voltage applied to the pixels of the display panel. A liquid crystal display is not good in displaying a dark image due to the backlight. This is because the backlight unit irradiates the same amount of light onto the entire screen of the display panel regardless of a luminance distribution of the input image. Hence, the liquid crystal display has a limited contrast ratio.

SUMMARY

In one aspect, there is provided a light valve panel including a liquid crystal layer, a first electrode receiving a light valve data voltage through a light valve data line, and a second electrode facing the first electrode with the liquid crystal layer interposed therebetween, and receiving a common voltage swinging in the same phase in synchronization with the light valve data voltage.

In another aspect, there is provided a liquid crystal display device including a display panel on which pixels to which an input image is applied are arranged, a backlight unit irradiating light onto the display panel, and a light valve panel disposed between the display panel and the backlight unit, and which adjusts an amount of light from the backlight unit depending on the input image. The light valve panel includes a liquid crystal layer, a first electrode receiving a light valve data voltage through a light valve data line, and a second electrode facing the first electrode with the liquid crystal layer interposed therebetween, and receiving a common voltage swinging in the same phase in synchronization with the light valve data voltage.

In a further aspect, light valve panel having first and second substrates includes a first electrode on the first substrate, receiving a common voltage, a second electrode on the second substrate, facing the first electrode, and receiving a light valve data voltage, and a light valve data line supplying the light valve data voltage, wherein the light valve panel compensates a voltage drop of the light valve data voltage at the second electrode by swinging the common voltage synchronized with the light valve data voltage to have the same phase with each other.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate aspects of the disclosure and together with the description serve to explain the principles of the disclosure.

In the drawings.

DETAILED DESCRIPTION

Reference will now be made in example aspects of the disclosure, of which are illustrated in the accompanying drawings. Wherever possible, the same reference numbers will be used throughout the drawings to refer to the same or like parts. It will be paid attention that detailed description of known arts will be omitted.

Figure 1:
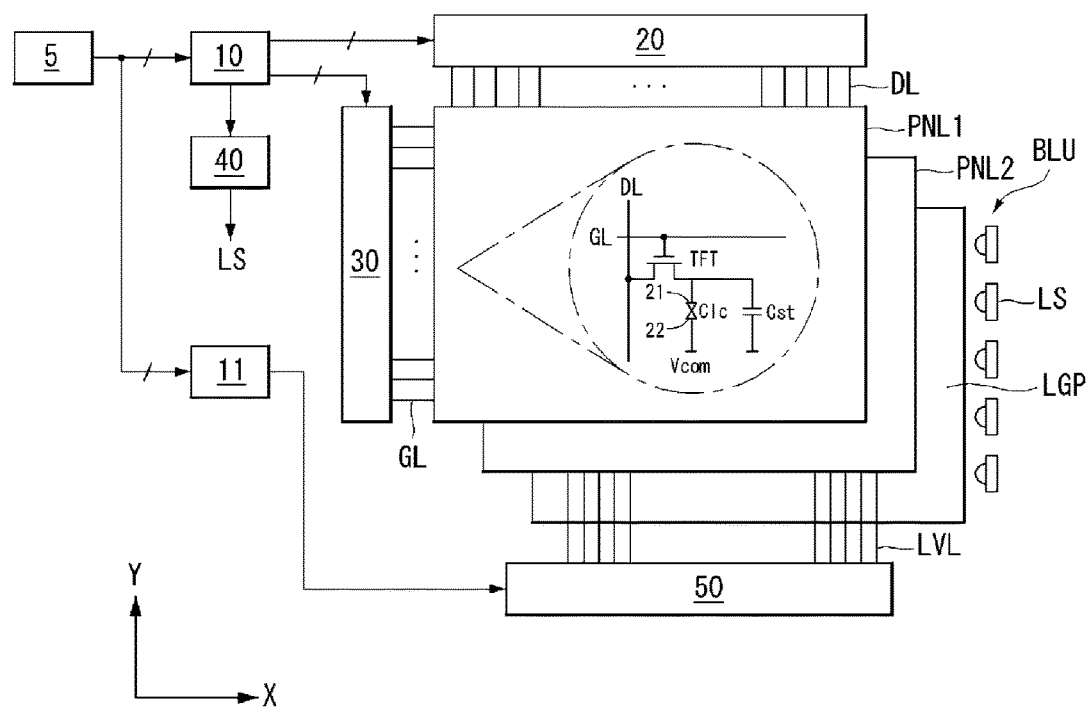
FIG. 1 is a block diagram of a liquid crystal display according to an aspect of the disclosure.
Figure 2:
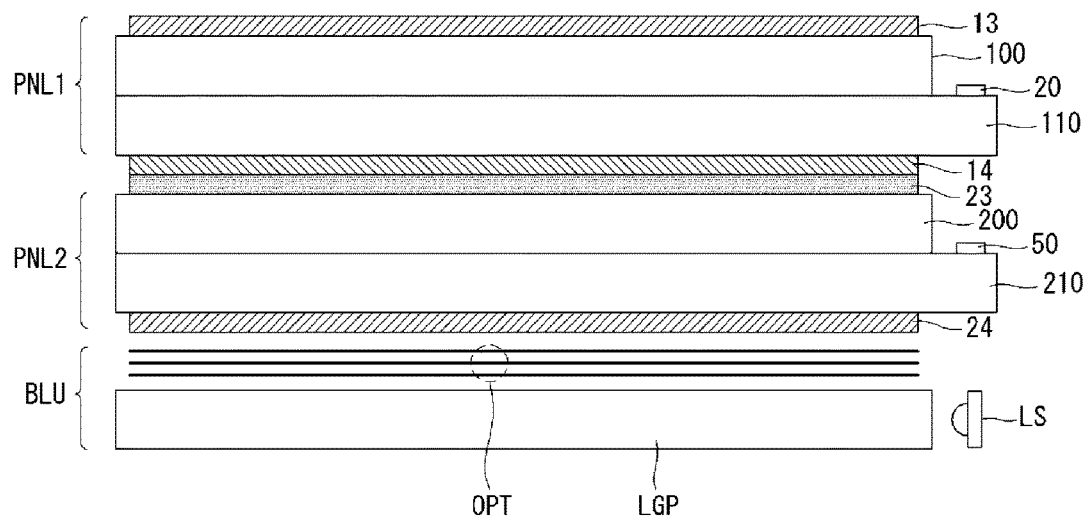
FIG. 2 is a cross-sectional view illustrating a stack structure of a display panel, a light valve panel, and a backlight unit shown in FIG. 1.

Referring to FIGS. 1 and 2, a liquid crystal display according to an aspect of the disclosure includes a display panel PNL1 including a pixel array, a backlight unit BLU irradiating light onto the display panel PNL1, a light valve panel PNL2 disposed between the display panel PNL1 and the backlight unit BLU, a first panel driving circuit 10, 20, and 30, a second panel driving circuit 11 and 50, and a backlight driving circuit 40.

The display panel PNL1 includes a first upper substrate 100 and a first lower substrate 110, which are positioned opposite to each other with a liquid crystal layer interposed therebetween.

On the first upper substrate 100, a color filter array including black matrixes and color filters is formed.

On the first lower substrate 110, data lines DL, gate lines GL, common electrodes 22, pixel electrodes 21 connected to TFTs, storage capacitors Cst connected to the pixel electrodes 21, and the like are formed. The TFTs are respectively formed in subpixels and are connected to the pixel electrodes 21. The TFTs may be implemented as one of an amorphous silicon (a-Si) TFT, a low temperature polysilicon (LTPS) TFT, an oxide TFT, and the like. The TFTs are respectively connected to the pixel electrodes 21 of the subpixels. The common electrode 22 and the pixel electrode 21 are separated from each other with an insulating layer interposed therebetween.

The display panel PNL1 may be implemented as one of liquid crystal modes including a twisted nematic (TN) mode, a vertical alignment (VA) mode, an in-plane switching (IPS) mode, a fringe field switching (FFS) mode, etc.

Polarizing films 13 and 14 are respectively attached to the first upper substrate 100 and the first lower substrate 110 of the display panel PNL1. Alignment layers for setting a pre-tilt angle of liquid crystals are respectively formed on the first upper substrate 100 and the first lower substrate 110 of the display panel PNL1. A spacer for maintaining a cell gap of liquid crystal cells Clc may be formed between the first upper substrate 100 and the first lower substrate 110 of the display panel PNL1.

The light valve panel PNL2 is disposed between the display panel PNL1 and the backlight unit BLU. The light valve panel PNL2 drives liquid crystal molecules based on a difference between the voltages applied to a second upper substrate 200 and a second lower substrate 210 of the light valve panel PNL2 and adjusts an amount of light to be irradiated onto the display panel PNL1. The light valve panel PNL2 acts as a liquid crystal shutter that adjusts an amount of light in synchronization with an input image using electrically controlled liquid crystal molecules.

The liquid crystals of the light valve panel PNL2 may be driven in a TN mode. A luminance of the liquid crystal cell Clc in the TN mode may be adjusted depending on a transmittance-voltage curve (hereinafter, referred to as "T-V curve") of normally white. In the T-V curve of the normally white, as the voltage decreases, the transmittance increases. Hence, the luminance of the liquid crystal cell increases. On the contrary, as the voltage increase, the transmittance decreases. Hence, the luminance of the liquid crystal cell decreases. The structure and operation of the light valve panel PNL2 will be described later in detail.

The display panel PNL1 and the light valve panel PNL2 may be attached to each other using an adhesive 23, for example, an optical clear adhesive (OCA).

The first panel driving circuit 10, 20, and 30 applies data of an input image to the pixels. The first panel driving circuit 10, 20, and 30 includes a first timing controller 10, a first data driver 20, and a gate driver 30. The first panel driving circuit 10, 20, and 30 may be integrated into one IC.

The first timing controller 10 transmits digital video data of an input image received from a host system 5 to the first data driver 20. The first timing controller 10 receives timing signals synchronized with the data of the input image from the host system 5. The timing signals include a vertical sync signal Vsync, a horizontal sync signal Hsync, a data enable signal DE, and a clock CLK, etc. The first timing controller 10 controls operation timings of the first data driver 20 and the gate driver 30 based on the timing signals Vsync, Hsync, DE, and CLK received together with pixel data of the input image. The first timing controller 10 may transmit a polarity control signal for controlling a polarity of the pixel array to each of source driver ICs of the first data driver 20.

Output channels of the first data driver 20 are connected to the data lines DL of the pixel array. The first data driver 20 receives the digital video data of the input image from the first timing controller 10. The first data driver 20 converts the digital video data of the input image into positive and negative gamma compensation voltages under the control of the first timing controller 10 and outputs positive and negative data voltages. An output voltage of the first data driver 20 is supplied to the data lines DL. The first data driver 20 inverts a polarity of the data voltage to be supplied to the pixels under the control of the first timing controller 10.

The gate driver 30 sequentially supplies gate pulses synchronized with the data voltage to the gate lines GL under the control of the first timing controller 10. The gate pulses output from the gate driver 30 are synchronized with the data voltage supplied to the data lines DL.

The second panel driving circuit adjusts an amount of light transmitted by the light valve panel PNL2 in synchronization with an input image and improves a contrast ratio of an image reproduced on the display panel PNL1. The second panel driving circuit includes a second timing controller 11 and a second data driver 50. The second timing controller 11 and the second data driver 50 may be integrated into one IC.

The second timing controller 11 transmits data of an input image to the second data driver 50. The second timing controller 11 receives timing signals synchronized with the data of the input image from the host system 5. The timing signals include a vertical sync signal Vsync, a horizontal sync signal Hsync, a data enable signal DE, and a clock CLK, etc. The second timing controller 11 controls operation timing of the second data driver 50 based on the timing signals Vsync, Hsync, DE, and CLK received together with pixel data of the input image.

The second data driver 50 receives digital video data of an input image from the second timing controller 11. The second data driver 50 converts the digital video data of the input image into positive and negative gamma compensation voltages under the control of the second timing controller 11 and outputs positive and negative data voltages. An output voltage of the second data driver 50 is supplied to data lines LVL. The second data driver 50 inverts a polarity of the data voltage to be supplied to the pixels under the control of second timing controller 11.

The first and second panel driving circuits may be integrated in various types. For example, the first and second timing controllers 10 and 11 may be integrated into one IC. The first and second panel driving circuits may be integrated into one IC.

The backlight unit BLU may be implemented as a direct type backlight unit or an edge type backlight unit. The backlight unit BLU includes light sources LS, a light guide plate LGP, an optical sheet OPT, and the like. The light source LS may be implemented as a point light source such as a light emitting diode (LED). Luminances of the light sources LS are individually adjusted depending on a driving voltage supplied by a backlight unit driver 40. The optical sheet OPT includes one or more prism sheets and one or more diffuser sheets. The optical sheet OPT diffuses light incident from the light guide plate LGP and refracts a travelling path of light at an angle substantially vertical to a light incident surface of the display panel PNL1.

The host system 5 may be one of a television system, a set-top box, a navigation system, a DVD player, a Blu-ray player, a personal computer (PC), a home theater system, and a phone system.

The liquid crystal display according to the aspect of the disclosure further includes a power unit, which is not illustrated in the drawings. The power unit generates voltages required to drive the display panel PNL1 and the light valve panel PNL2 using a DC-DC converter. The voltages includes a high potential power voltage VDD, a logic power voltage VCC, a gamma reference voltage, a gate high voltage VGH, a gate low voltage VGL, a common voltage Vcom, and other voltages. The high potential power voltage VDD is a maximum value of the data voltage, to which pixels of the display panel PNL1 will be charged. The logic power voltage VCC is an IC power voltage of the first and second panel driving circuits. The gate high voltage VGH is a high logic voltage of the gate pulse, which is set to be equal to or greater than a threshold voltage of the TFTs of the pixel array. The gate low voltage VGL is a low logic voltage of the gate pulse, which is set to be less than the threshold voltage of the TFTs of the pixel array. The gate high voltage VGH and the gate low voltage VGL are supplied to the gate driver 30. The gate pulse swings between the gate high voltage VGH and the gate low voltage VGL. The common voltage Vcom is supplied to the common electrode 22 of the liquid crystal cells Clc. The power unit divides the high potential power voltage VDD and generates the gamma reference voltage. The gamma reference voltage is divided by a voltage divider circuit installed inside the first data driver 20 and is divided into positive and negative gamma compensation voltages depending on a gray scale.

The light valve panel PNL2 precisely controls an amount of light irradiated onto each pixel in synchronization with data of an input image displayed on the pixel array and maximizes a contrast ratio of an image reproduced on the display panel PNL1. The detailed features will be described with reference to FIG. 3.

Figure 3:
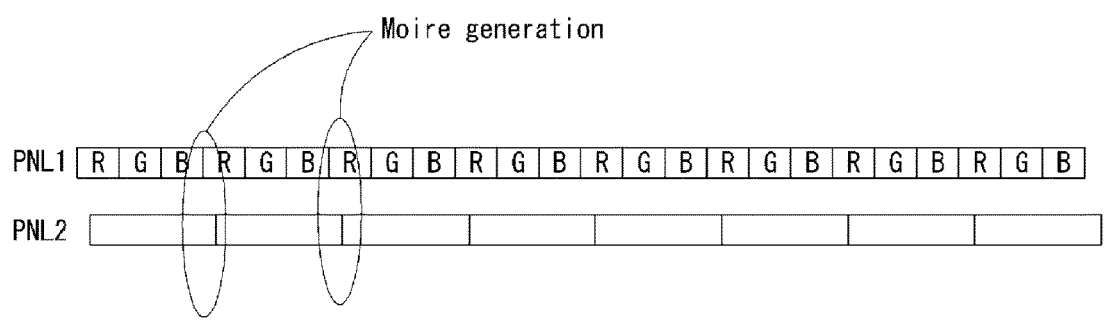
FIG. 3 illustrates a moiré pattern caused by an inference of light generated when metal lines of a display panel and metal lines of a light valve panel overlap each other.

Lines are formed on each of the display panel PNL1 and the light valve panel PNL2. These lines are not transparent and may be formed as metal lines having a high reflectance. The metal lines include data lines in a vertical direction, gate lines in a horizontal direction, and common lines of the horizontal direction. The common lines are connected to the common electrodes of the pixels and supply the common voltage Vcom to the common electrodes. Because the metal lines having the high reflectance lead to a reduction in the contrast ratio by reflecting external light, the metal lines and the TFTs are covered by a black matrix pattern. In this instance, when the lines of the display panel PNL1 overlap the lines of the light valve panel PNL2, the moiré phenomenon may be generated in the vertical and horizontal directions due to interference of light if a misalignment is generated as shown in FIG. 3. In order to reduce the moiré phenomenon, a diffuser sheet diffusing light may be disposed between the display panel PNL1 and the light valve panel PNL2. On the other hand, the aspect of the disclosure removes the horizontal lines from the light valve panel PNL2 and forms the electrodes of the upper and lower substrates and the lines using a transparent electrode material, thereby minimizing the moiré phenomenon without adding the diffuser sheet.

Figure 4:
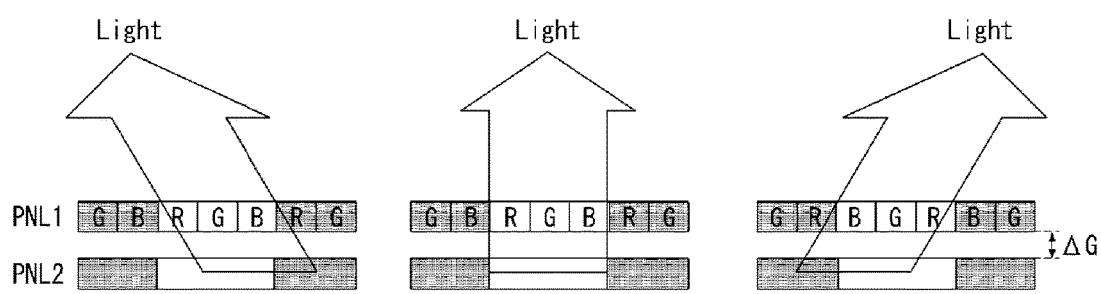
FIG. 4 illustrates a distortion of color generated by a gap between a display panel and a light valve panel.

When a user watches the liquid crystal display from a front viewing angle, the user may watch an image at a desired luminance. However, when the user watches the liquid crystal display from side viewing angles, a luminance and a color of the image may change. As shown in the middle diagram of FIG. 4, the front viewing angle is a viewing angle obtained when the user watches a display surface of the display panel PNL1 at an angle of 90°. The side viewing angle is a viewing angle obtained when the user watches the display surface of the display panel PNL1 at an angle leaned to the left side or the right side. In FIG. 4, a left diagram is shown at a left viewing angle of 45°, and a right diagram is shown at a right viewing angle of 45°. In particular, because a predetermined gap AG is unconditionally formed between the display panel PNL1 and the light valve panel PNL2, a color distortion of the liquid crystal display including the light valve panel PNL2 may more obviously appear from the side viewing angles. In FIG. 4, only blocks of the light valve panel PNL2 positioned under pixels represented with white color transmit light, and other blocks of the light valve panel PNL2 block light. In this instance, when the user watches the liquid crystal display from the side viewing angles, luminances of some colors are reduced, and the color distortion appears. A method for adjusting a luminance of the light valve panel PNL2 shown in FIG. 5 may be considered, so as to improve the luminance of the side viewing angles. It should be noted that an example illustrated in FIG. 5 is not a related art.

Figure 5:
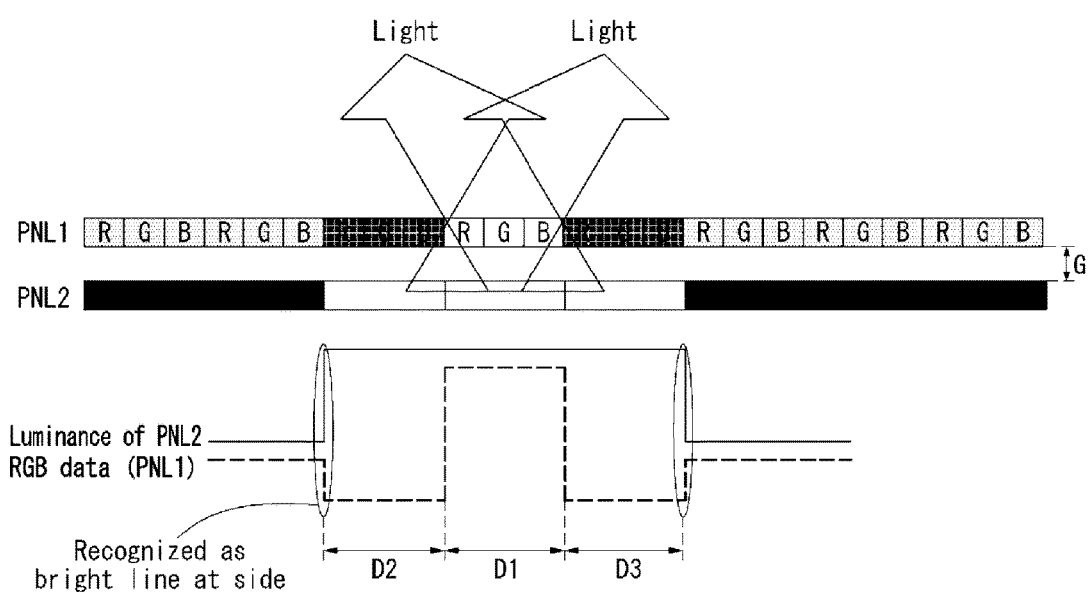
FIG. 5 illustrates an example of a bad bright line appearing when a dark block adjacent to a bright block in a light valve panel is turned on so as to prevent color distortion of a side viewing angle.

FIG. 5 illustrates an example of a distorted bright line appearing when a dark block adjacent to a bright block of the light valve panel PNL2 is turned on so as to prevent the color distortion of the side viewing angles. The bright block is disposed under a bright pixel (hereinafter, referred to as "ON-pixel") of the display panel PNL1 and means a block (hereinafter, referred to as "ON-block") of the light valve panel PNL2 irradiating light onto the ON-pixel. The bright pixel is a pixel to which data of a high gray level, for example, a white gray level is applied. The dark block means a block (hereinafter, referred to as "OFF-block") of the light valve panel PNL2 disposed under a dark pixel (hereinafter, referred to as "OFF-pixel") adjacent to the ON-pixel of the display panel PNL1. The dark pixel is a pixel to which data of a low gray level, for example, a black gray level lower than the gray level of the ON-pixel is applied. As shown in FIG. 5, when luminances of the OFF-blocks adjacent to the ON-block increase, each of red, green, and blue data at the side viewing angles can be seen to have a desired luminance. Therefore, the color distortion at the side viewing angles can be reduced or prevented. On the other hand, when luminances of the OFF-blocks increase, luminances of the OFF-pixels may increase Hence, luminances of the OFF-pixels at the front viewing angle may increase. In order to compensate for a reduction in image quality at the front viewing angle, the luminance of the OFF-pixel may be decreased using a modulation method for reducing a data value of the OFF-pixel adjacent to the ON-pixel. However, the modulation method may lead to the bright line phenomenon, in which a boundary between the OFF-pixel receiving data and the OFF-pixel receiving original data looks bright.

The aspect of the disclosure adjusts a luminance of the light valve panel PNL2 through a gradation method by distributing the voltage to the block in a manner that a luminance of the OFF-block adjacent to the ON-block in the light valve panel PNL2 gradually changes, so as to reduce the luminance and the color distortion at the side viewing angle and prevent the bright line phenomenon. Further, the aspect of the disclosure may control a gray level of the OFF-pixel adjacent to the ON-pixel in reverse of a gradation luminance control method of the OFF-block.

Figure 6:
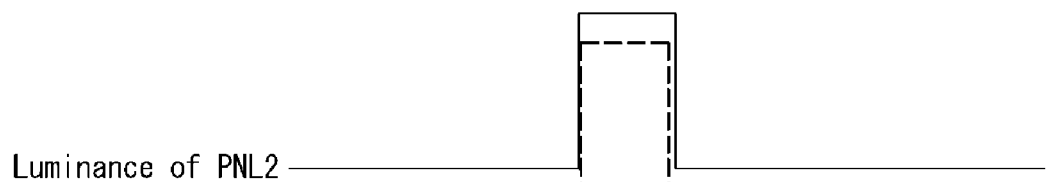
FIG. 6 illustrates a pixel data modulation method of a display panel and a block luminance control method of a light valve panel.
Figure 6:
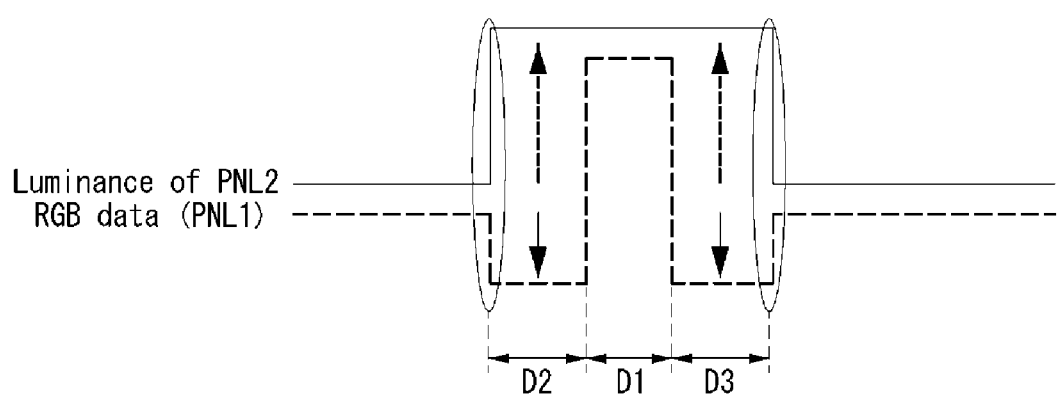
Figure 6:
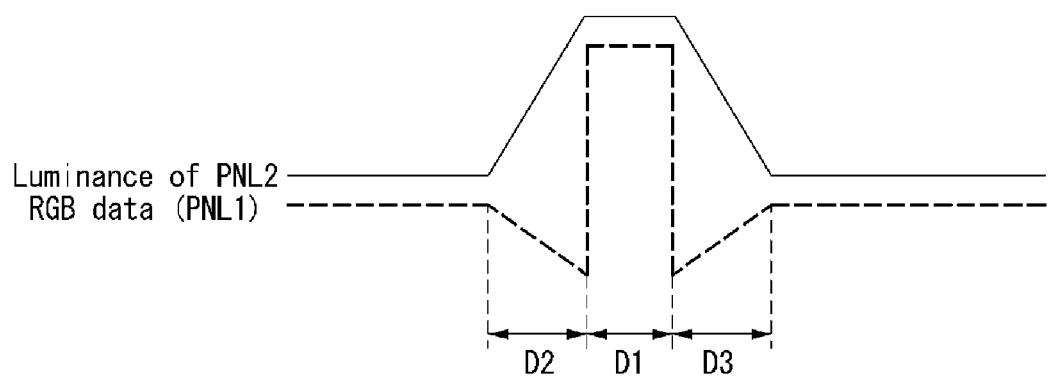
Figure 7:
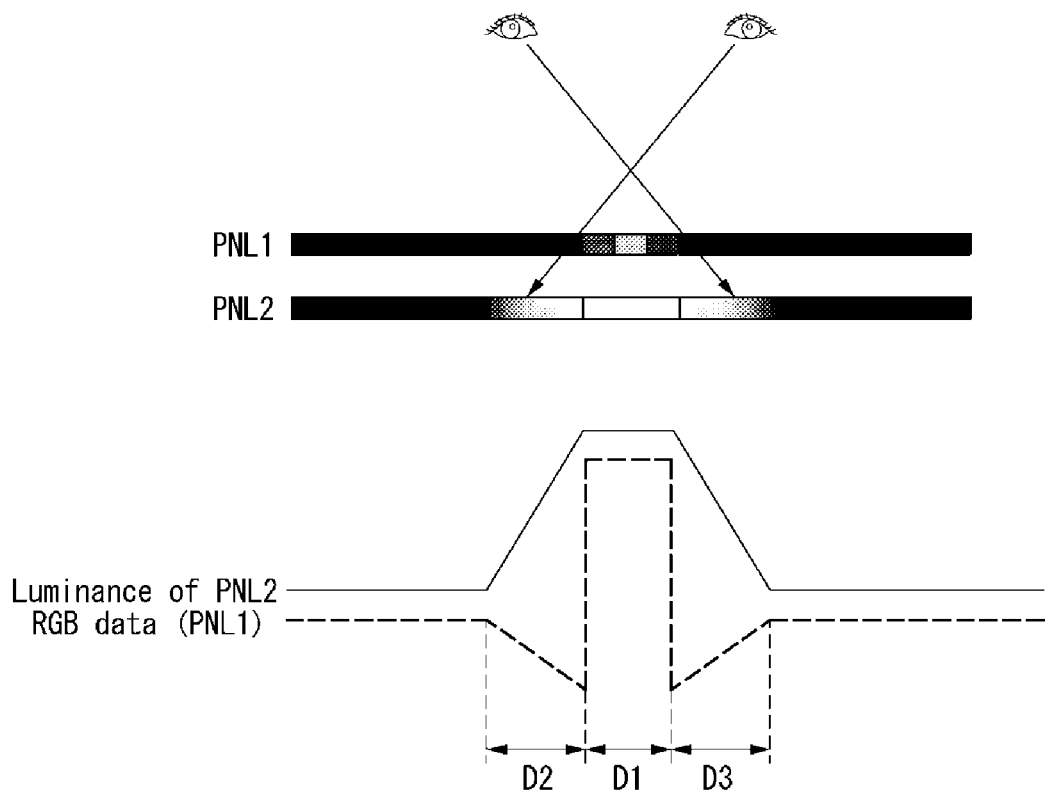
FIG. 7 illustrates a luminance of a pixel at a side viewing angle when data and a luminance of a display panel are controlled through a control method illustrated in (C) of FIG. 6.

FIG. 6 illustrates a pixel data modulation method of the display panel and a block luminance control method of the light valve panel. FIG. 7 illustrates a luminance of a pixel at a side viewing angle when data and a luminance of the display panel are controlled through a control method illustrated in (C) of FIG. 6.

In FIG. 6, D1 denotes a location of an ON-pixel and a location of an ON-block under the ON-pixel. D2 and D3 respectively denote a location of an OFF-pixel and a location of an OFF-block under the OFF-pixel.

More specifically, (A) in FIG. 6 illustrates an example where data of a high gray level is applied only to an ON-pixel, and only an ON-block is turned on at a high luminance. (B) in FIG. 6 illustrates a method for increasing a luminance of an OFF-block adjacent to the ON-block by a luminance of the ON-block and reducing a gray level of data to be applied to an OFF-pixel adjacent to the ON-pixel, so as to improve side viewing angles.

(C) in FIG. 6 and FIG. 7 illustrate a method for gradually reducing a luminance of an OFF-block as the OFF-block is far away from the ON-block while increasing the luminance of the OFF-block adjacent to the ON-block by a luminance of the ON-block, so as to improve a side viewing angle and a bright line. Each block of the light valve panel PNL2 is disposed under pixels of the display panel PNL1 and irradiates light onto the pixels. Thus, there are OFF-pixels in the OFF-block adjacent to the ON-block, and gray levels of the OFF-pixels can be individually adjusted as shown in (C) of FIG. 6 and FIG. 7. The pixel data modulation method may use the gradation method shown in (C) of FIG. 6. Other methods may be used. For example, a luminance of the light valve panel PNL2 may use the gradation method of (C) in FIG. 6, and the pixel data modulation method may use the method shown in (B) or (C) of FIG. 6.

Figure 8:
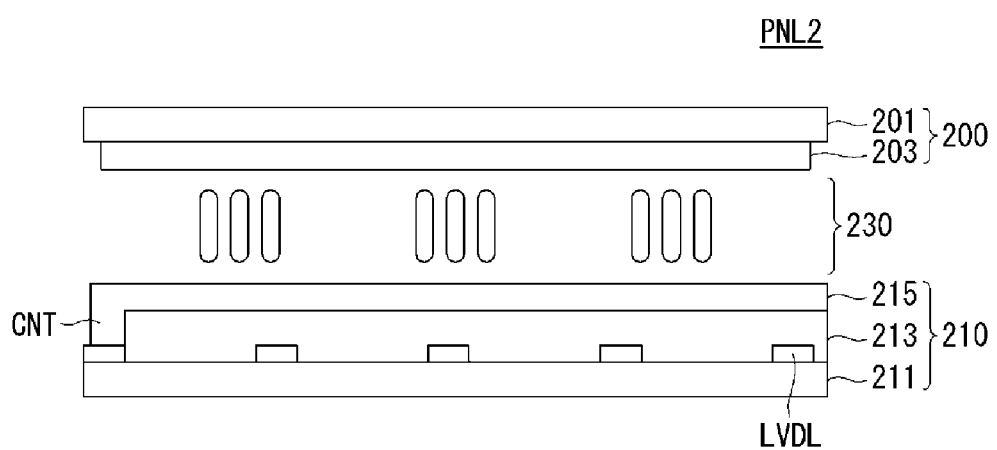
FIG. 8 is a cross-sectional view of a light valve panel.

FIG. 8 is a cross-sectional view of a light valve panel.

Referring to FIG. 8, the light valve panel PNL 2 includes a second upper substrate 200 and a second lower substrate 210.

The second upper substrate 200 includes a first base substrate 201 and a second electrode 203. The second electrode 203 may be formed of a transparent electrode material such as indium tin oxide (ITO). The second upper substrate 200 may include a black matrix (BM) if necessary. Hereinafter, the second electrode 203 will be referred to as an upper electrode 203 in the present disclosure.

The second lower substrate 210 includes a second base substrate 211, a light valve data line LVDL, and a first electrode 215. Hereinafter, the first electrode 215 will be referred to as a lower electrode 215 in the present disclosure.

The lower electrode 215 may be formed of a transparent electrode material such as ITO. The lower electrode 215 is disposed over the entire surface of the second lower substrate 201 of the light valve panel PNL2. The light valve data line LVDL is formed of a transparent electrode material such as indium tin oxide (ITO) and indium zinc oxide (IZO). The light valve data line LVDL may be formed of a transparent electrode, so as to prevent the moiré phenomenon but is not limited thereto. The light valve data line LVDL may be formed of a low resistance metal, so as to compensate for a resistance of the transparent electrode.

The light valve data lines LVDL are connected to the lower electrode 215 through a contact hole CNT to directly supply a light valve data voltage. Therefore, the light valve panel PNL2 does not need a TFT or a gate line (or a scan line). Hence, the aspect of the disclosure can prevent a moiré phenomenon and a bright line phenomenon and can further reduce the number of manufacturing processes of the light valve panel PNL2 by simplifying a structure of the light valve panel PNL2, thereby increasing a yield. Further, the aspect of the disclosure omits a gate driving circuit for driving the light valve panel PNL2 and thus can implement a lower cost light valve panel PNL2.

A polarizing film 24 (shown in FIG. 2) is attached to the second lower substrate 210 of the light valve panel PNL2. A liquid crystal layer 230 is formed between the second substrate 200 and the second lower substrate 201. Alignment layers are respectively formed on the surfaces contacting the liquid crystal layer 230 at the second upper substrate 200 and the second lower substrate 210 of the light valve panel PNL2. A spacer for maintaining a cell gap of the liquid crystal cells may be formed between the second upper substrate 200 and the second lower substrate 210 of the light valve panel PNL2.

Figure 9:
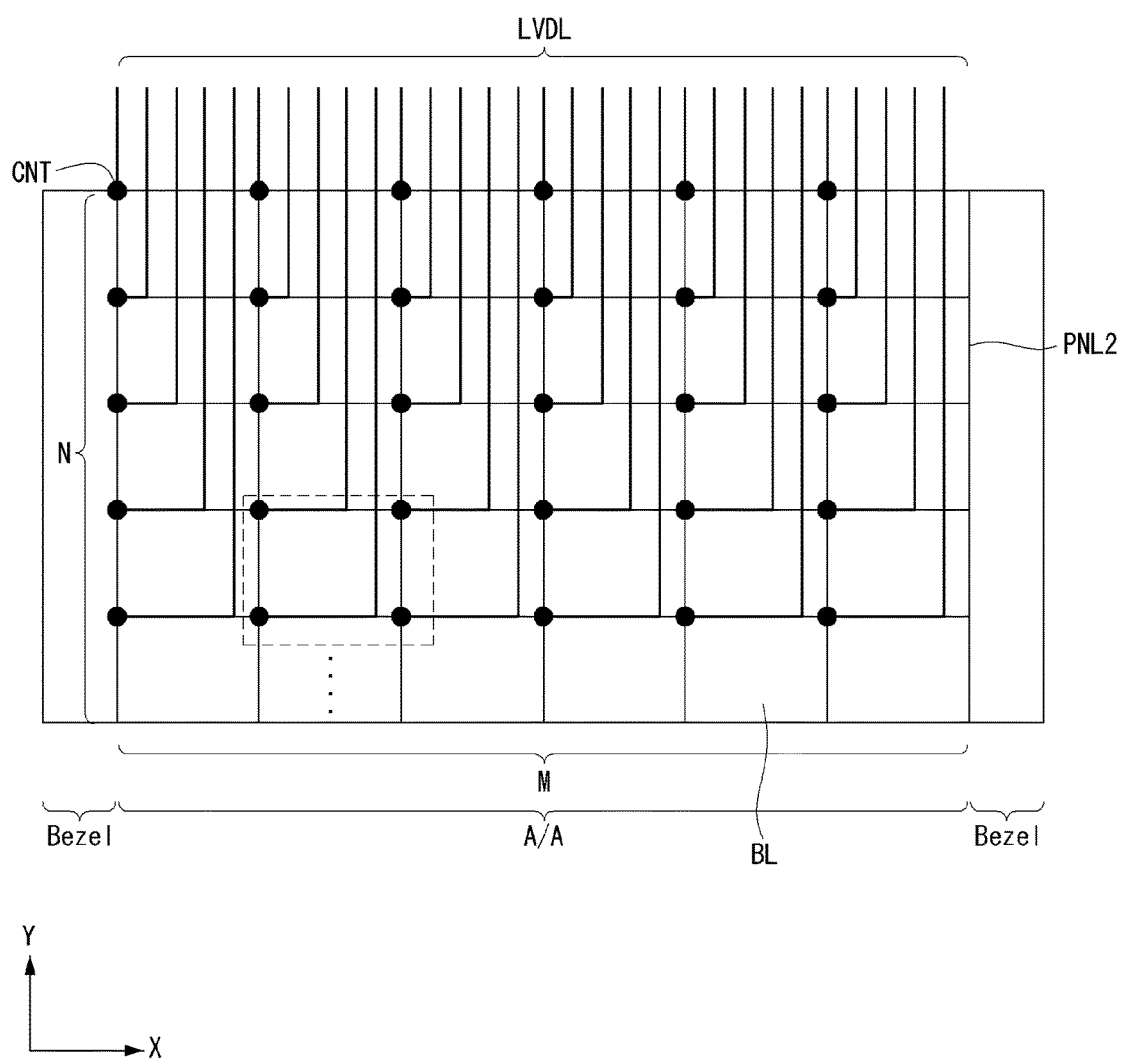
FIG. 9 is a diagram illustrating block division of a light valve panel of the disclosure.

FIG. 9 is a view illustrating block division of a light valve panel of the disclosure.

Referring to FIGS. 8 and 9, the lower electrode 215 of the light valve panel PNL2 includes an active area A/A and a bezel area Bezel. There are m×n blocks BL arranged in the active area A/A.

The light valve data lines LVDL are parallel with each other and arranged in a vertical direction (a y-axis direction) in the active area A/A. Each of the light valve data lines LVDL is connected to blocks BL through a contact hole CNT. ~T is distributed to an area of the block BL.

The light valve data lines LVDL are arranged vertically in parallel with a column direction (a y-axis direction) of the pixels P.

Figure 10:
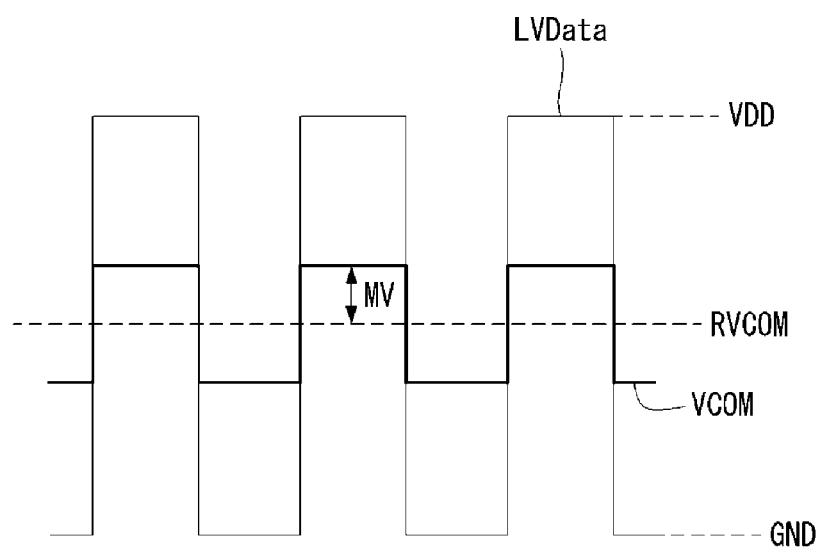
FIG. 10 is a diagram illustrating a driving voltage of a light valve panel according to an aspect of the disclosure.

FIG. 10 is a diagram illustrating a driving voltage of a light valve panel according to an aspect of the disclosure.

Referring to FIG. 10, a polarity of a light valve data voltage LVData is inverted at regular intervals. Hereinafter, in the polarity of the light valve data voltage LVData of the present disclosure, a voltage higher than a reference common voltage RVCOM is defined as a positive polarity and a voltage lower than the reference common voltage RVCOM is defined as a negative polarity. A period in which the polarity of the light valve data voltage LVData is inverted may be synchronized with a polarity inversion period of a data voltage supplied to the pixel P of the display panel PNL1. A magnitude of the light valve data voltage LVData may be determined based on an image data and may be determined as a voltage level between a low potential voltage GND and a high potential voltage VDD.

The reference common voltage RVCOM refers to as an average value of the low potential voltage GND and the high potential voltage VDD in the light valve data voltage LVData.

A period of a common voltage VCOM is synchronized with a period of the light valve data voltage LVData, and the common voltage VCOM swings so as to have the same phase. In a polarity of the common voltage VCOM of the present disclosure, a voltage higher than the reference common voltage RVCOM is defined as a positive polarity and a voltage lower than the reference common voltage RVCOM is defined as a negative polarity. The common voltage VCOM swings in a range between a positive voltage having a voltage level higher than the reference common voltage RVCOM by a modulation voltage MV and a negative voltage having a voltage level lower than the reference common voltage RVCOM by a modulation voltage MV.

The common voltage VCOM applied to the upper electrode 203 (shown in FIG. 8) swings with the same polarity as the light valve data voltage LVData applied to the lower electrode 215 (shown in FIG. 8). Therefore, it is possible to improve an occurrence of image defects at the boundary of an image object displayed in white.

An aspect of the disclosure will be described in addition to a comparative example in which the common voltage VCOM of a constant voltage is applied.

Figure 11:
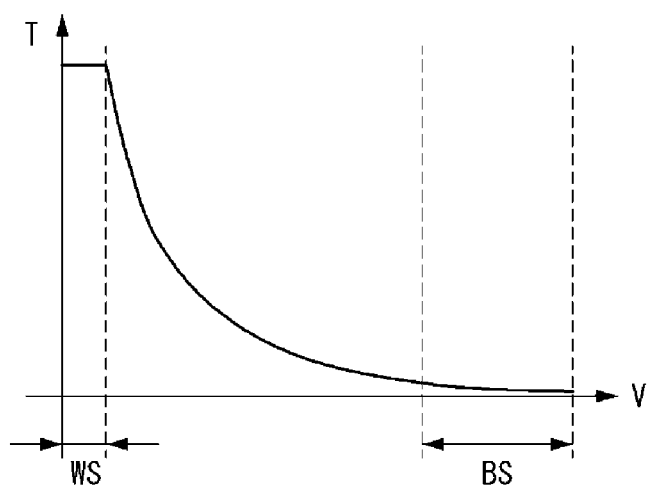
FIG. 11 is a diagram illustrating a V-T characteristic curve of a liquid crystal layer of a light valve panel.

FIG. 11 is a diagram illustrating TN mode characteristics for driving a liquid crystal layer 230 of a light valve panel PNL 2. FIG. 11 illustrates transmittance T of the liquid crystal layer 230 depending on a difference voltage V between the upper electrode 203 and the lower electrode 215.

Referring to FIG. 11, in a normally white V-T curve, as the voltage difference between the upper electrode 203 and the lower electrode 215 is small, the transmittance becomes higher and the luminance of the light valve panel PNL2 becomes higher. On the contrary, as the voltage difference between the upper electrode 203 and the lower electrode 215 is large, the transmittance becomes lower and the luminance of the light valve panel PNL2 becomes lower. When the voltage difference between the upper electrode 203 and the lower electrode 215 belongs to a white margin WS, the light valve panel PNL2 displays white. When the voltage difference between the upper electrode 203 and the lower electrode 215 belongs to a black margin BS, the light valve panel PNL2 displays black.

Figure 12:
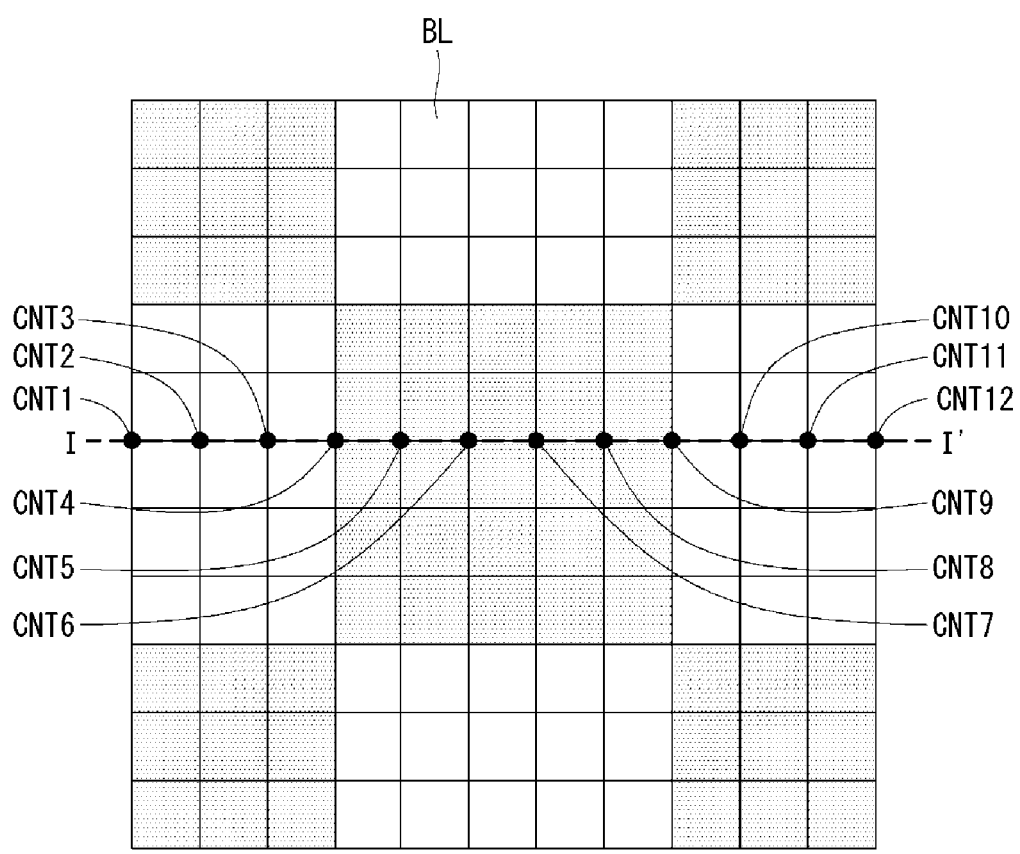
FIGS. 12 to 14 are diagrams illustrating a voltage drop phenomenon of a lower electrode in a block image display process.
Figure 13:
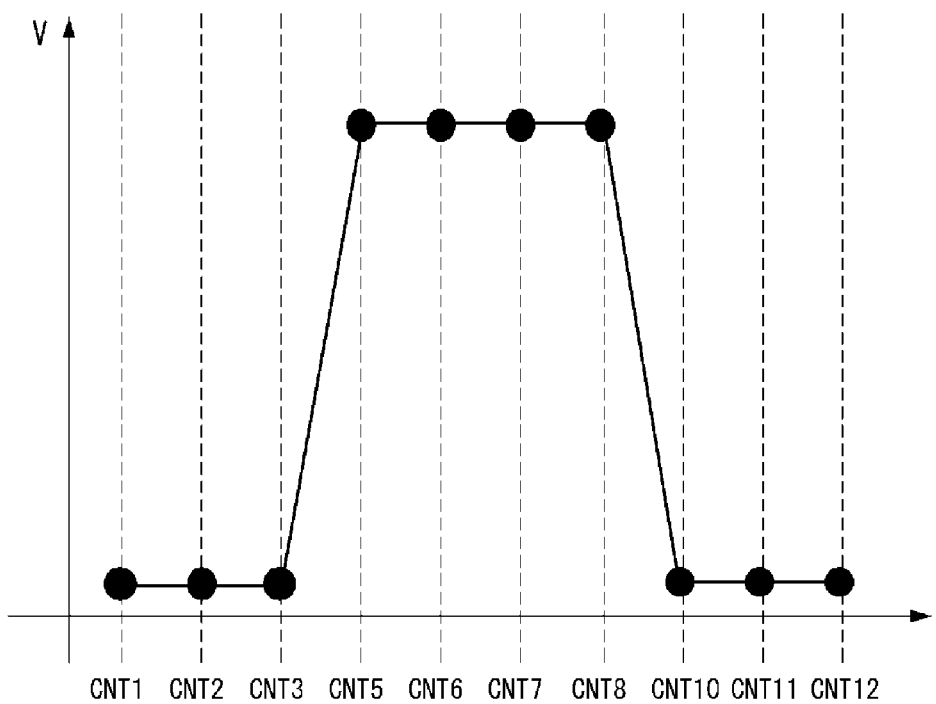
Figure 14:
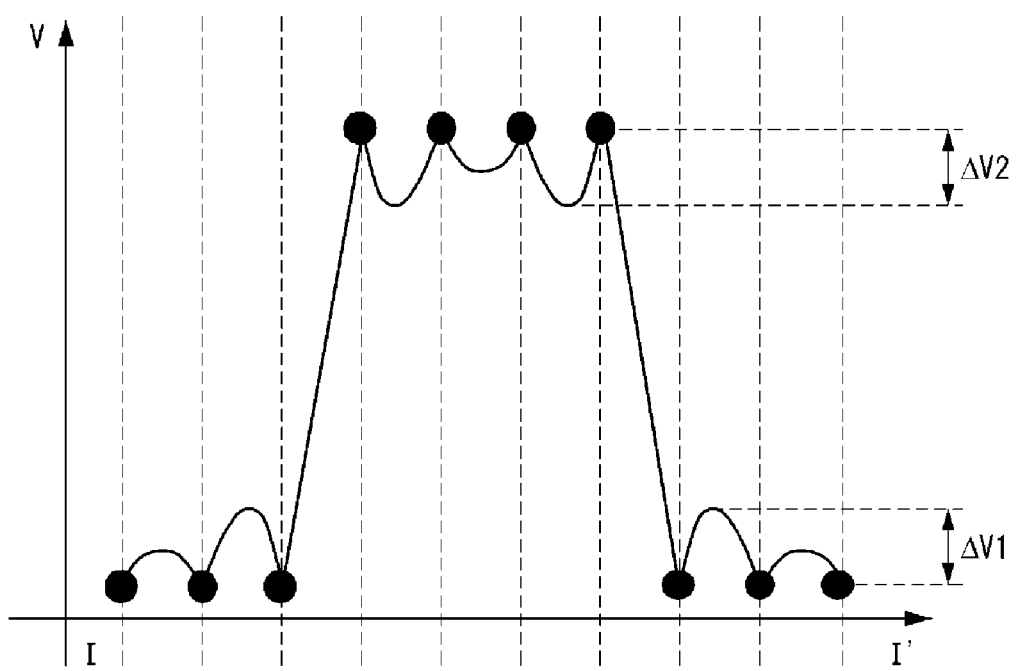

FIG. 12 is a diagram illustrating an example of a block image of a light valve panel. FIG. 13 is a graph illustrating a light valve data voltage and a reference common voltage according to a comparative example. FIG. 14 is a graph illustrating voltage distributions in blocks of the lower electrode to which a light valve data voltage shown in FIG. 13 is applied. A first to twelfth light valve data voltages LVData shown in FIG. 13 are voltages applied to a first to twelfth contact holes CNT1 to CNT12 located on I-I' in FIG. 12. The reference common voltage RVCOM according to the comparative example shown in FIG. 13 is different from the common voltage VCOM according to the present disclosure in that it maintains a constant voltage. FIG. 13 shows a positive light valve data voltage LVData in which a voltage level of the light valve data voltage LVData is larger than the reference common voltage RVCOM.

In a process of displaying the pattern image as shown in FIG. 12 by the light valve panel PNL2 operating in the TN mode, a comparative example in which a constant voltage is applied to the upper electrode will be described below.

Referring to FIGS. 12 and 13, a voltage equal to or close to a magnitude of the reference common voltage RVCOM is applied to the first to third contact holes CNT1 to CNT3 belonging to a block that displays white. A voltage equal to or close to the high potential voltage VDD is applied to the fifth to eighth contact holes CNT5 to CON8 belonging a block that displays black. The voltage applied through the light valve data line LVDL is distributed to the blocks BL of the lower electrode 215.

The reference common voltage RVCOM, which is the constant voltage shown in FIG. 10, is applied to the upper electrode 203.

FIG. 13 is an ideal voltage distribution of the lower electrode 215 located on I-I' of the light valve panel PNL2 by a voltage applied to the light valve data line LVDL. However, the voltage applied to the contact holes CNT is lowered due to a sheet resistance of the lower electrode 215, so that a voltage distribution of the lower electrode 215 located on I-I' appears as shown in FIG. 14. As a result, as shown in FIG. 14, the blocks BL that display white have a voltage higher than the voltage applied to the contact hole CNT toward the central area. The blocks BL that display black have a voltage lower than the voltage applied to the contact hole CNT toward the central area. The voltage distribution of the lower electrode 215 has voltage deviations $\Delta V1$ and $\Delta V2$ in comparison with the ideal voltage distribution excluding the sheet resistance.

The blocks BL display different luminance due to the voltage deviations $\Delta V1$ and $\Delta V2$. However, when the voltage deviations $\Delta V1$ and $\Delta V2$ belong to the white margin WS or the black margin BS, the desired luminance can be displayed. For example, when a black voltage deviation $\Delta V2$ belongs to the black margin BS shown in FIG. 11, the blocks BL display a black image. Further, when a white voltage deviation $\Delta V1$ belongs to the white margin WS shown in FIG. 11, the blocks BL display a white image.

As shown in FIG. 11, since the V-T curve of the TN mode has a relatively large black margin BS, even if the black voltage deviation $\Delta V2$ occurs as shown in FIG. 14, an image distortion does not occur and blocks BL can display black.

However, since the white margin WS is considerably narrower than the black margin BS, the white voltage deviation $\Delta V1$ may deviate from the white margin WS. In particular, as shown in FIG. 12, blocks BL displaying white at a position adjacent to the boundary between the white image and the black image have a larger voltage rise due to an influence of the high potential voltage VDD applied to the adjacent block BL. As a result, there is a problem that the blocks BL, which should display white, but display gray.

In contrast to this comparative example, an operation of securing the white margin WS of the light valve panel according to an aspect of the present disclosure is as follows.

Figure 15:
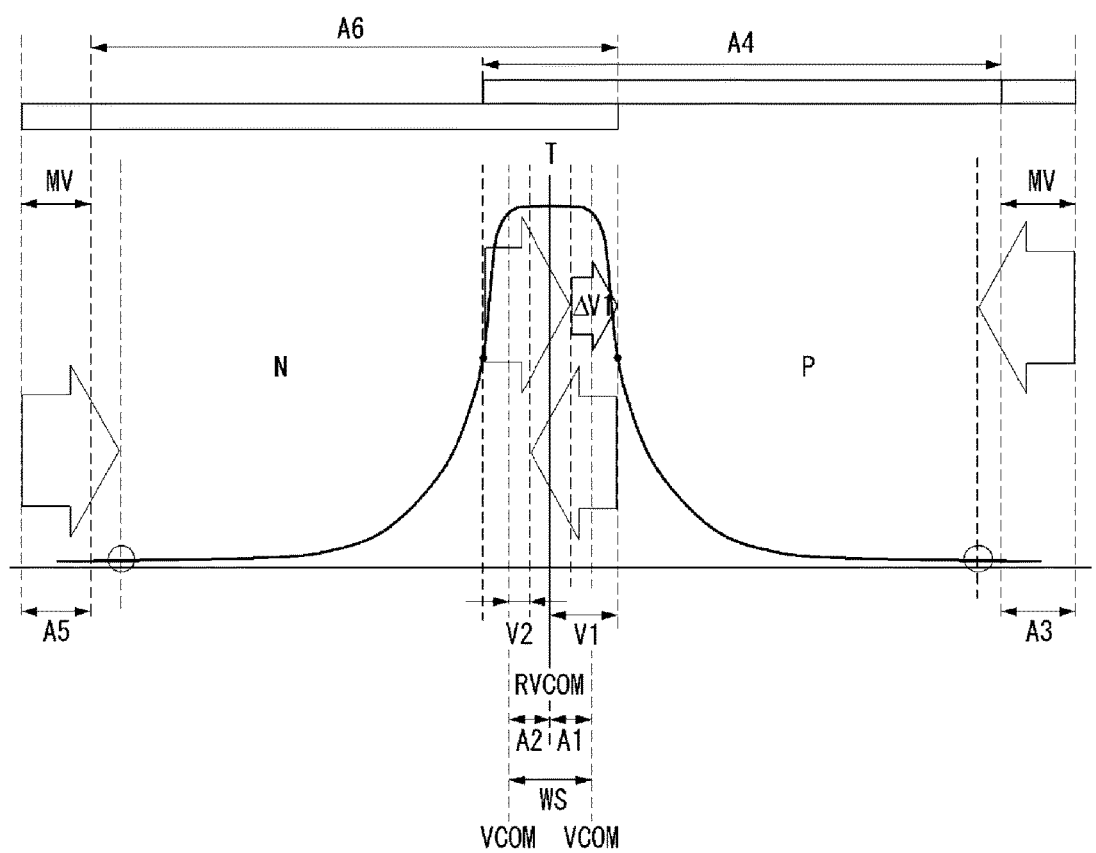
FIGS. 15 to 16 are diagrams illustrating a process of securing a white margin by a common voltage of the disclosure.
Figure 16:
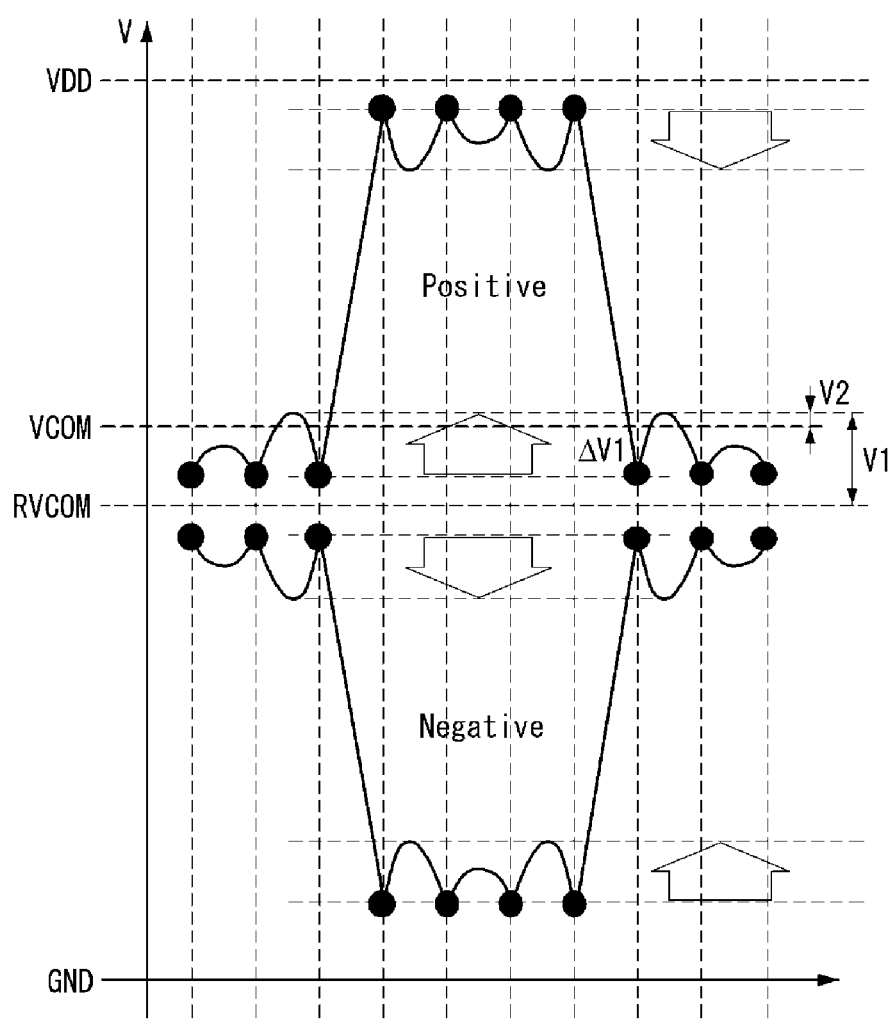

FIG. 15 is a diagram illustrating a V-T characteristic curve of the TN mode when a voltage amplitude of the common voltage VCOM is raised by the modulation voltage MV in comparison with the reference common voltage RVCOM. FIG. 16 is a schematic diagram for explaining a principle of compensating a voltage drop of a lower electrode by a common voltage according to an aspect of the disclosure.

Referring to FIGS. 15 and 16, the V-T characteristic curve of the disclosure is as follows.

When the light valve data voltage LVData is positive, the common voltage VCOM has a value higher than the reference common voltage RVCOM by the modulation voltage MV.

When the voltage of the upper electrode 203 becomes high, the voltage difference between the lower electrode 215 and the upper electrode 203 becomes smaller, and a section of the V-T characteristic curve is shifted to the left direction. For example, as shown in FIG. 16, a voltage level of a block BL in which a difference voltage V from the reference common voltage RVCOM is V1 becomes a voltage level of the block BL in which a difference voltage V from the common voltage VCOM is V2. When the common voltage VCOM rises by the modulation voltage MV, in the V-T characteristic curve with reference to the reference common voltage RVCOM, a difference voltage V in a first section A1 in which the difference voltage V is smaller than a magnitude of the modulation voltage MV becomes a negative(−)

voltage. As a result, when the voltage of the upper electrode 203 rises by the magnitude of the modulation voltage MV, a V-T characteristic curve belonging to the first section A1 in the lower electrode 215 belongs to a V-T characteristic curve belonging to a second section A2. That is, when the difference voltage V is V1, image distortion may occur due to deviation from the white margin WS. However, when the common voltage VCOM rises as in the disclosure, image distortion does not occur because it belongs to a white margin range of an opposite polarity area.

When the voltage of the upper electrode 203 rises by the magnitude of the modulation voltage MV, a maximum value of the difference voltage V between the lower electrode 215 and the upper electrode 203 becomes a value obtained by subtracting the modulation voltage MV from the high potential voltage VDD. As a result, when the voltage of the upper electrode 203 rises by the magnitude of the modulation voltage MV, a V-T characteristic curve of a third section A3 is excluded.

As a result, when the voltage of the upper electrode 203 rises by the magnitude of the modulation voltage MV, a V-T characteristic curve for the positive light valve data voltage VLData belongs to a fourth section A4.

When the light valve data voltage LVData is negative, the common voltage VCOM has a voltage lower than the reference common voltage RVCOM by the modulation voltage MV.

When the voltage of the upper electrode 203 is lowered, as the voltage difference between the lower electrode 215 and the upper electrode 203 becomes smaller, a section of the V-T characteristic curve is shifted to the right direction. In particular, when the common voltage VCOM is lowered by the modulation voltage MV, in the V-T characteristic curve with reference to the reference common voltage RVCOM, a difference voltage V of the second section A2 in which the difference voltage V is smaller than the magnitude of the modulation voltage MV becomes a positive(+) voltage. As a result, when the voltage of the upper electrode 203 is lowered by the magnitude of the modulation voltage MV, a V-T characteristic curve belonging to the second section A2 in the lower electrode 215 belongs to a V-T characteristic curve belonging to the first section A1.

When the voltage of the upper electrode 203 is a value smaller by the magnitude of the modulation voltage MV, a maximum value of the difference voltage V between the lower electrode 215 and the upper electrode 203 is a value obtained by adding the modulation voltage MV to the low potential voltage GND. As a result, when the voltage of the upper electrode 203 falls by the magnitude of the modulation voltage MV, a V-T characteristic curve of a fifth section A5 is excluded.

As a result, when the voltage of the upper electrode 203 falls by the magnitude of the modulation voltage MV, a V-T characteristic curve for the negative light valve data voltage LVData belongs to a sixth section A6.

As a result, the V-T characteristic curves by the positive light valve data voltage LVData and the negative light valve data voltage LVData belong to the fourth section A4 and the sixth section A6, respectively. The white margin WS is increased by the magnitude of the modulation voltage MV from the reference common voltage RVCOM. In the light valve panel PNL2 of the disclosure, since the common voltage VCOM swings in the same phase as the light valve data voltage LVData, the white margin WS can be secured. As a result, it is possible to improve an occurrence of image defects in the block BL for displaying the white image due to insufficient white margin.

Meanwhile, in the light valve data voltage LVData of the disclosure, the black margin BS decreases. However, since the width of the black margin BS is considerably larger than the width of the white margin WS, it is rare that the difference voltage V deviates from the black margin BS even if the black margin BS decreases. Further, even if the black image displayed by the block BL is distorted due to the deviation from the black margin BS, since the block BL is not visually perceptible, compensation conditions for widening the white margin WS are possible.

A degree to which the white margin WS increases in the light valve panel PNL2 of the disclosure is proportional to the modulation voltage MV of the common voltage VCOM. The magnitude of the modulation voltage MV is the same as the difference from the reference common voltage RVCOM. The magnitude of the modulation voltage MV is set to such a degree that no inversion occurs in the white image display period. When the magnitude of the modulation voltage MV is larger than the voltage level width of the white margin, it is deviated from the white margin in the opposite polarity area of the V-T characteristic curve. Therefore, the magnitude of the modulation voltage MV is set to be equal to or less than the voltage width of the white margin in the V-T characteristic curve with reference to the reference common voltage RVCOM. The white margin can be calculated during a design process of the light valve panel, and the magnitude of the modulation voltage MV can be determined based on this.

Although aspects have been described with reference to a number of illustrative aspects thereof, it should be understood that numerous other modifications and aspects can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light valve panel comprising:
a first electrode on a first substrate, receiving a common voltage;
a second electrode on a second substrate, facing the first electrode, and receiving a light valve data voltage; and
a light valve data line directly connected to the second electrode through a contact hole and supplying the light valve data voltage to the second electrode,
wherein the common voltage swings in the same phase in synchronization with the light valve data voltage, and
wherein a modulation voltage is a difference between the common voltage and a reference common voltage, and the modulation voltage has a magnitude not greater than a white margin in a voltage-transmittance (V-T) characteristic curve of a liquid crystal layer.

2. The light valve panel of claim 1, wherein the liquid crystal layer is disposed between the first and second electrodes.

3. The light valve panel of claim 2, wherein the light valve data voltage swings between a positive voltage of a voltage level higher than the reference common voltage and a negative voltage of a voltage level lower than the reference common voltage.

4. The light valve panel of claim 3, wherein the common voltage swings with a predetermined amplitude of the modulation voltage with reference to the reference common voltage.

5. The light valve panel of claim 1, wherein the second electrode is divided by a plurality of blocks.

6. The light valve panel of claim 1, wherein the second electrode is formed of a single layer and the light valve data voltage is distributed to the plurality of blocks.

7. A liquid crystal display device comprising:
a display panel including pixels to which an input image is applied;
a backlight unit irradiating light onto the display panel; and
a light valve panel disposed between the display panel and the backlight unit, the light valve panel configured to adjust an amount of the irradiated light from the backlight unit depending on the input image,
wherein the light valve panel includes:
a liquid crystal layer;
a first electrode on a first substrate, receiving a common voltage; and
a second electrode on a second substrate, facing the first electrode with the liquid crystal layer interposed therebetween, and receiving a light valve data voltage through a light valve data line directly connected to the second electrode through a contact hole,
wherein the common voltage swings in the same phase in synchronization with the light valve data voltage, and
wherein a modulation voltage is a difference between the common voltage and a reference common voltage, and the modulation voltage has a magnitude not greater than a white margin in a voltage-transmittance (V-T) characteristic curve of a liquid crystal layer.

8. The liquid crystal display device of claim 7, wherein the light valve data voltage swings between a positive voltage of a voltage level higher than the reference common voltage and a negative voltage of a voltage level lower than the reference common voltage.

9. The liquid crystal display device of claim 8, wherein the common voltage swings with a predetermined amplitude of the modulation voltage with reference to the reference common voltage.

10. The light valve panel of claim 7, wherein the second electrode is divided by a plurality of blocks.

11. The liquid crystal display device of claim 10, wherein the second electrode is made of a single layer and the light valve data voltage is distributed to the plurality of blocks.

12. A light valve panel having first and second substrates, configured to control an amount of incident light based on a luminance distribution of an input image, comprising:
a first electrode on the first substrate, receiving a common voltage;
a second electrode on the second substrate, facing the first electrode, and receiving a light valve data voltage; and
a light valve data line directly connected to the second electrode through a contact hole and supplying the light valve data voltage to the second electrode,
wherein the light valve panel controls the amount of the incident light by compensating a voltage drop of the light valve data voltage at the second electrode through swinging the common voltage synchronized with the light valve data voltage to have the same phase with each other, and
wherein a modulation voltage is a difference between the common voltage and a reference common voltage, and the modulation voltage has a magnitude not greater than a white margin in a voltage-transmittance (V-T) characteristic curve of a liquid crystal layer.

13. The light valve panel of claim 12, wherein the light valve data line is connected to the second electrode through a plurality of contact holes, wherein the plurality of contact holes are spaced apart from each other in the same distance at a center portion of the second electrode in a horizontal direction.

14. The light valve panel of claim 12, wherein the light valve data voltage swings between a positive voltage of a voltage level higher than the reference common voltage and a negative voltage of a voltage level lower than the reference common voltage.

15. The light valve panel of claim 14, wherein the common voltage swings with a predetermined amplitude of the modulation voltage with reference to the reference common voltage.

16. The light valve panel of claim 12, wherein the second electrode is divided by a plurality of blocks.

17. The light valve panel of claim 16, wherein the light valve data voltage is distributed to the plurality of blocks of the second electrode.

* * * * *